Nov. 13, 1951 D. M. DEAN 2,575,049
FISHING POLE CONSTRUCTION
Filed Oct. 25, 1948
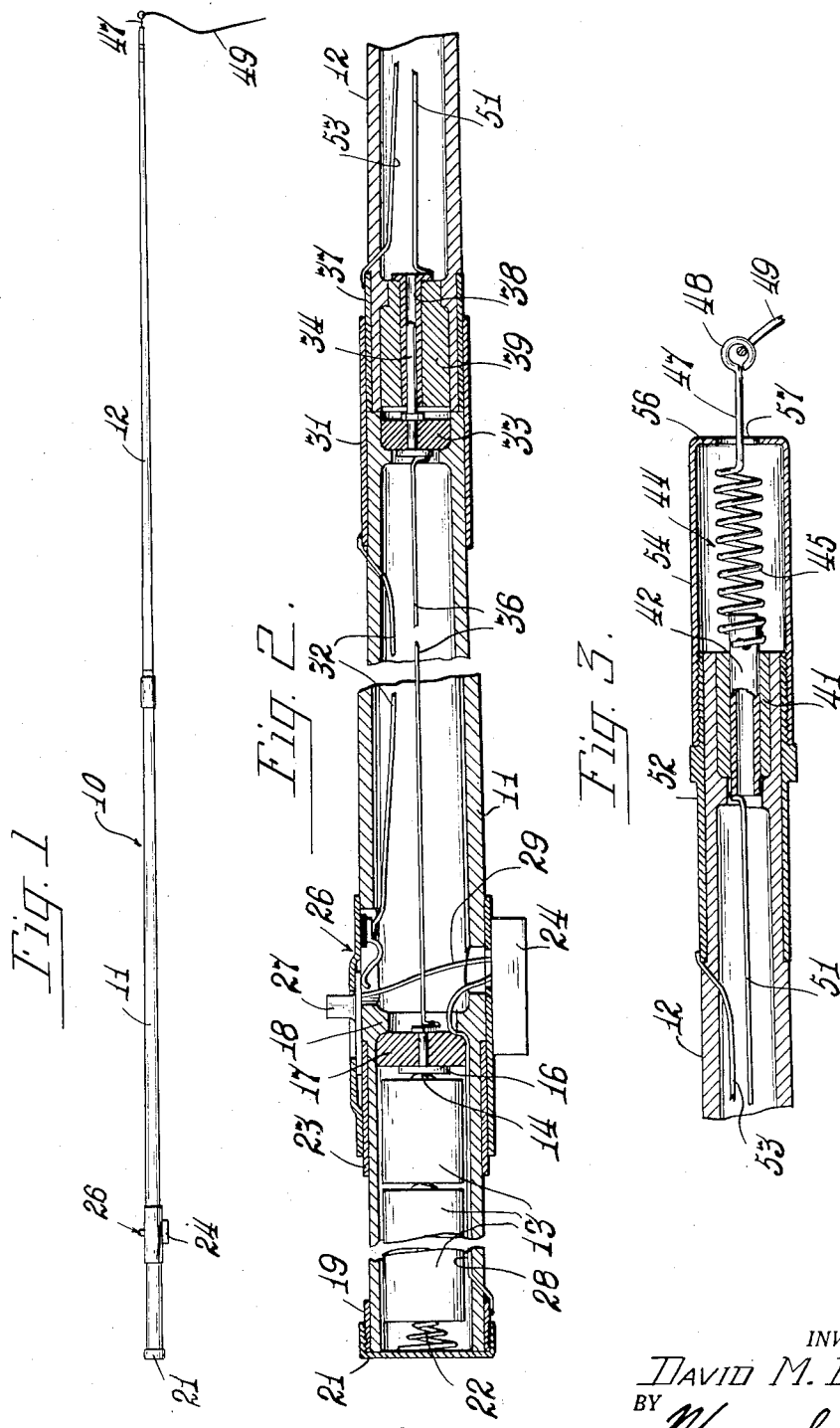
INVENTOR.
DAVID M. DEAN
BY
ATTORNEY Patented Nov. 13, 1951

2,575,049

UNITED STATES PATENT OFFICE 2,575,049

FISHING POLE CONSTRUCTION

David M. Dean, Chicago, Ill., assignor of one-half to Albert Leibowitz, Chicago, Ill.

Application October 25, 1948, Serial No. 56,429

1 Claim. (Cl. 43—17)

This invention relates to fishing poles and, more particularly, to improved fishing poles having indicating means for signaling the presence of a fish on the line.

One of the objects of my invention is the provision of electrical means incorporated in the structure of a fishing pole, which means is responsive, when a fish nibbles at the bait or takes the hook, to give a visual or audibile signal of such nature that the fisherman will be advised that his attention is required.

Another object of my invention is the provision of a fishing pole of the foregoing character wherein the elements comprising the signaling means are of a minimum size and are arranged so as to present a minimum of parts outwardly of the fishing pole, thereby not detracting from the appearance of the pole or interfering with the manipulation thereof.

Other objects and advantages of my invention will hereinafter become more fully apparent from the following description and claim and the drawing, wherein:

Fig. 1 is an elevational view of a fishing pole, showing the signaling means attached thereto.

Fig. 2 is an enlarged longitudinal cross sectional view through a portion of the fishing pole.

Fig. 3 is a similar view through the opposite end of the fishing pole.

Referring to the drawing, wherein is shown a preferred embodiment of my invention, the numeral 10 indicates generally a fishing pole comprised of two bamboo sections 11 and 12, although it will be understood that the pole may consist of only one or more than two sections and may be formed of metal or any other suitable material. In preparing a bamboo pole for use, I drill sections 11 and 12 axially to provide a continuous unobstructed bore therethrough. The handle portion of the section 11 is of a size such as to accommodate preferably two or more dry cell batteries 13, which are contained in the handle portion. The contact element 14 of the forward battery 13 engages a complementary contact element 16 carried on the plug 17, which is suitably secured in the bore of the handle portion of the pole section 11. The plug 17 preferably abuts the wall portion formed internally at the first node 18 of the pole section. A metal sleeve 19 having external threads is mounted on the handle portion and a threaded metal cap 21 is adapted for removable engagement with said sleeve. The cap 21 is provided with a spring 22, which is adapted to contact the metal casing of the rearward battery cell 13.

Mounted on the pole section near the handle portion is a sleeve 23 on which is suitably carried an electric buzzer 24 and thumb switch 26. Preferably, the sleeve 23 is cut out so as to permit accommodation of the switch body 26 within the bore of the pole section 11, thereby leaving only the thumb-engaging member 27 exposed for manipulation.

The sleeve 19 is in electrical connection with one terminal of the buzzer 24 by means of conduit wire 28. The other terminal of the buzzer 24 is connected to one terminal of the switch 26 through conduit wire 29.

Mounted on the end of the pole section 11 is a metal sleeve 31 which is in electrical connection with the other terminal of the switch 26 through conduit wire 32. A plug member 33, suitably secured within the bore at the end of pole section 11, carries an electrical contact pin 34 which is connected to the contact element 16 by means of conduit wire 36. As shown clearly in Fig. 2, the sleeve 31 and pin 34 extend beyond the end of the pole section 11 substantially the same distance, with the pin 34 disposed axially of said sleeve and in spaced relation thereto.

The second section 12 of the pole is similarly bored longitudinally and is provided at one end with a metal sleeve 37 and an electrical socket element 38 mounted in a plug 39 secured in the bore at the end of pole section 12. When the sections 11 and 12 are in assembled relation, the sleeve 37 is telescoped into sleeve 31 and the pin is received in socket 38.

Suitably mounted in the bore of pole section 12 at the extreme end thereof (Fig. 3) is a plug 41 which carries a tubular member 42, which preferably extends beyond the plug, as shown in Fig. 3. A resilient member, indicated generally by numeral 44, comprises a coil spring portion 45 and a straight portion 47 terminating in a closed loop to which the line 49 is attached. The coil spring portion 45 is soldered or otherwise suitably attached to the member 42, which is in electrical connection with the socket 38 through conduit wire 51. A metal sleeve 52 mounted on the end of the pole section 12 is in electrical connection with the sleeve 37 through conduit wire 53. The sleeve 52 is preferably threaded for a portion of its length to receive a tubular cap 54, which is formed with an end flange 56 forming a central aperture 57. When the cap 54 is in threaded engagement with the sleeve 52, the straight portion 47 of the resilient member 44 projects through the aperture 57, as shown in Fig. 3.

The normal tendency of the resilient member 44 is to assume the position shown in Fig. 3 with the straight portion 47 disposed substantially axially of the aperture 57 and in spaced relation to the edges thereof. With the switch 26 in closed position, when the line 49 is pulled by a bite or nibble, the portion 47 is urged downwardly so as to contact the edges of the flange 56, thereby completing an electrical circuit through the various elements hereinabove described to energize the buzzer 24, which gives an audible signal to indicate to the fisherman that he has a bite and that his attention is required. Should the pull on the line be in an axial direction, the spring portion 45 is urged into contact with the flange 56, similarly closing the circuit to the buzzer 24. It will be understood that, while a buzzer has been described as a preferred signalling means, a lamp may be used instead to give a visual signal.

The resilience of the member 44 is calibrated so that only a pull of a predetermined magnitude or greater will effect a deflection of the straight portion 47 of the member 44, thereby assuring that no insignificant tug or pull on the line 44 will cause a closing of the circuit and the production of a false signal.

I claim.

In a tubular fishing pole, a hollow tip, a plug positioned in said tip and extending axially thereof, a member rigidly secured in said plug, said member being aligned with said plug and having one end extending therebeyond, and a resilient element having a coil spring portion positioned within said tip with one end rigidly secured to said member, and a straight portion projecting through one end of said tip, said straight portion having a line attaching means at an end thereof.

DAVID M. DEAN.

REFERENCES CITED

The following references are of record in the file of this patent:

UNITED STATES PATENTS

| Number | Name | Date |
| --- | --- | --- |
| 289,033 | Shattuck | Nov. 27, 1883 |
| 467,120 | Kunzel | Jan. 12, 1892 |
| 758,218 | Roberts | Apr. 26, 1904 |
| 1,337,292 | Timmons | Apr. 20, 1920 |
| 1,752,397 | See | Apr. 1, 1930 |
| 2,104,888 | Spahr | Jan. 11, 1937 |
| 2,196,784 | Simmons et al. | Apr. 9, 1940 |
| 2,349,077 | Comparelli | May 16, 1944 |

FOREIGN PATENTS

| Number | Country | Date |
| --- | --- | --- |
| 8,603 | Norway | 1900 |